Oct. 18, 1960  H. L. BECK ET AL  2,956,606
PATCH ELEMENT FOR TUBELESS TIRES AND THE LIKE
Filed March 21, 1958

INVENTORS
Harold L. Beck &
BY   Harold E. Boettger

J.C. Thorpe
ATTORNEY

United States Patent Office 2,956,606
Patented Oct. 18, 1960

2,956,606

PATCH ELEMENT FOR TUBELESS TIRES AND THE LIKE

Harold L. Beck, Marine City, and Harold E. Boettger, Detroit, Mich., assignors to General Motors Corporation, Detroit, Mich., a corporation of Delaware Filed Mar. 21, 1958, Ser. No. 722,928

10 Claims. (Cl. 152—370)

This invention is directed to a pressure vessel and more particularly to a patch element or closure plug for a resilient or flexible pressure vessel, such as a tubeless tire, which is capable of repair use either in service stations, or for emergency service on the highway, or wherever else the particular pressure vessel may be located when requiring such repair.

The invention contemplates an improved plug-type resilient patch of a thermally bondable material insertable to seal a hole or puncture in a resilient pressure vessel and having a self-contained heating element therein structurally reinforcing the patch element and electrically energizable to effect thermal bonding between the patch and the pressure vessel. The invention further contemplates such a plug element which is maintainable in its desired location during the bonding operation either by a suitable mechanical clamp or by a limited amount of air pressure applied to the interior of the pressure vessel or tubeless tire.

The foregoing objectives of the invention are attained in one preferred illustrative embodiment thereof comprising a resilient patch element for a tubeless tire having a conically tapered plug portion insertable into a hole extending through the casing of the tire, a flange or head portion extending radially from the larger end of the tapered portion and intended to engage the inner surface of the tire, a coating of latex based adhesive on those surfaces of the tapered and flange portions engageable with the surfaces defining the hole through the tire, and having a heating element embedded within the tapered and flanged portions thereof which is electrically energizable to vulcanizably bond the patch to the surfaces of the tire. Any suitable power source might be used for electrically energizing the heating element of the patch including the battery of a vehicle, connection being made through any suitable electrical outlet of the vehicle, such as an outlet for a cigar lighter.

The external energizing circuit for the patch may also include a thermostatic switch or fuse adapted to shut off the heating element automatically to prevent overheating, but in the preferred form of the invention the coil wire is of such material and size as to fusibly break the electrical connection therethrough when the desired plug temperature for effecting the heat bonding has been achieved.

The foregoing and other objects, advantages and features of the invention will be more thoroughly understood from the following description of the illustrative embodiment thereof having reference to the drawing in which.

Figure 1:
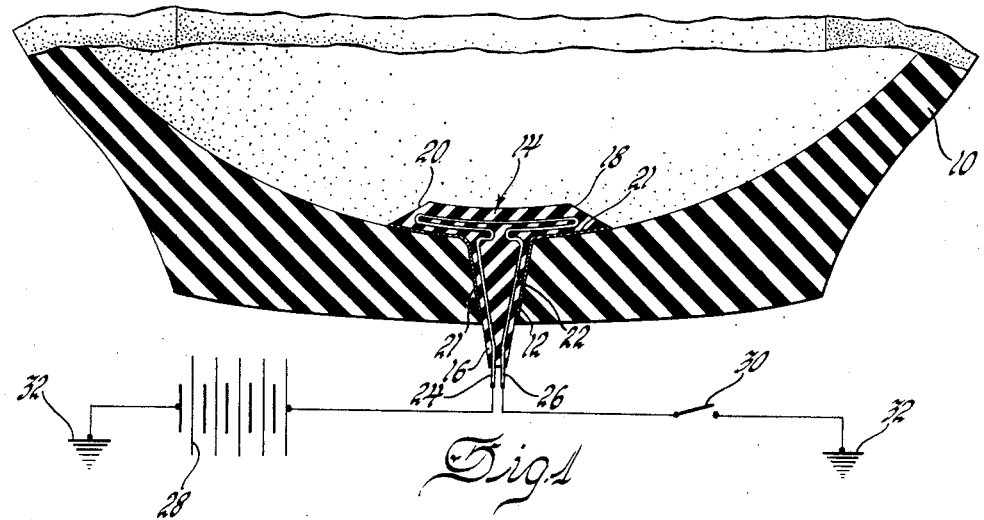
Figure 1 is a somewhat diagrammatic view showing a portion of a tubeless tire with portions thereof broken away and in section to show a patch member constructed in accordance with the invention prior to its thermal bonding (vulcanization) to the tire proper and schematically showing the patch encased heating element and an electrical energizing circuit therefor.
Figure 2:
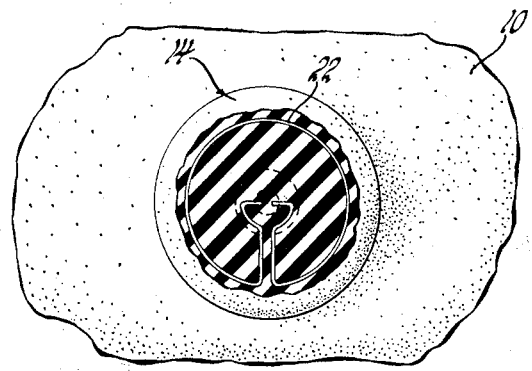
Figure 2 is an elevational view showing the patch member with portions thereof broken away and in section to show the preferred configuration of the heat element in greater detail.
Figure 3:
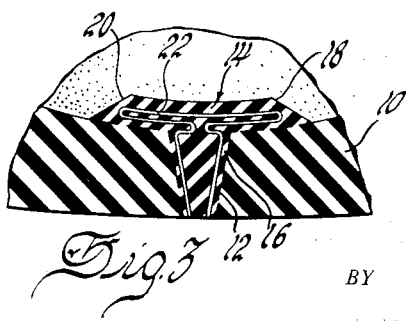
Figure 3 is a view similar to a portion of Figure 1 showing the patch member vulcanized to the tire casing and with the tip thereof removed.

Referring more particularly to the drawing, a tubeless tire is partially shown at 10 and has a conically tapered bore 12 extending therethrough. The bore 12 is formed in the tire casing to receive a patch element 14 by enlarging a puncture therein by use of a suitable tapered reaming tool, not shown, the bore 12 being tapered to converge toward the outside of the tire casing. The patch element is made of a suitable thermally bondable or vulcanizable material, i.e. rubber, and includes a conically tapered plug portion 16 which is insertable to sealingly engage the cooperating taper of the bore 12. A flange or head portion 18 extends radially from the larger inner end of the taper portion 16 and provides an annular shoulder engageable with the inner surface of the tire casing. This flange portion is of a substantially greater diameter than the tapered portion 16 and is beveled adjacent its periphery at 20 toward the inner surface of the casing.

In the illustrative embodiment, the tire contacting surfaces of the patch element are precoated with a latex based, pressure sensitive type adhesive indicated at 21 which is protected by a suitable platsic or fabric backing, not shown, prior to use of the patch element. In the absence of such a precoating of adhesive or in addition thereto, a liquid type adhesive may be applied to such tire contacting surfaces just prior to use. Such adhesives provide a temporary bonding seal between the patch and the hole defining surfaces of the tire and may include certain well known elements or compounds for facilitating the subsequent heat effected vulcanizing or bonding of the patch to the tire casing.

A wire heating element 22 for vulcanizing the patch to the tire casing is embedded within the patch. The ends of the wire heating element project from the smaller end of the tapered portion 16 to provide suitable contact terminals indicated at 24 and 26. From these contact terminals, the end portions of the wire element extend longitudinally of the tapered portion to a point centrally of the flange portion and thence radially outwardly of the flange in electrically insulated spaced relation to each other and are interconnected by the intermediate portion of said wire which extends annularly of said flange portion. The wire element is preferably of such material and size as to break the electrical connection therethrough whenever the temperature thereof and thereby the temperature level of the plug have reached the temperature levels required for proper thermal bonding or vulcanization of the patch to the tire proper. This resultant break in the electrical connection will generally occur in the closely paralleled radially extending portions of the wire element. In the absence of such a fusible heating element the switch 30 should be of a thermostatic type adapted to break the electrical connection to prevent possible overheating of the patch element.

Upon at least partial removal of the tire from the rim of its mounting wheel to permit access to the puncture, the puncture opening therein is prepared to receive the patch element 14 by the reaming tool, not shown, which is designed to provide proper taper and dimensions of the conical bore 12. After removal of the adhesive protecting backing, the patch or plug element is then inserted to sealingly engage the tapered bore and the adjacent inner surface of the tire. The patch and tire are then mechanically clamped together or, in the absence of such mechanical clamping means, the tire may be sealably remounted on the wheel rim and inflated to a pressure sufficient to maintain the patch in proper pressure sealing contact with the surfaces of the tire. The contact portions 24 and 26 of the heating element 22 are then connected as shown in Figure 1 to a suitable power source, the contact 24 being connected directly to one terminal of a storage battery 28 and the contact 26 being connected through a switch 30 and ground connections indicated at 32 to the opposite terminal of the battery supply. Upon closing of the switch 30, the wire element 22 is caused to heat thereby effecting the thermal bonding or vulcanization of the patch element to the tire casing.

After completion of the heat bonding process the electrical connections are removed and the tip of the patch projecting from the tire is removed. The tire is then filled in its mounted position to its desired operating pressure either by a carbon dioxide cartridge or by a suitable air pressure supply, such as an air compressor or accumulator on vehicles equipped with air suspensions, air brakes or other air operated accessories.

While the invention as herein described has been related to a single embodiment thereof intended for use in the repair of a tubeless tire, it will be obvious to those skilled in the art that various modifications might be made therein, including its modification to accommodate the repair of other types of resilient or pliable vessels of rubber, plastic, or the like, without departing from the spirit and scope of the invention as defined in the following claims.

We claim:

1. A rubber patch element for repairing a rubber pressure vessel such as a tubeless tire, comprising a conically tapered plug portion insertable to engage surfaces defining a hole extending through said pressure vessel and a flange portion extending radially from the larger end of said tapered portion to define a radially extending surface engageable with the inner surface of said vessel adjacent said hole, said element having a coating of latex based adhesive on the surfaces thereof engageable with the surfaces of said pressure vessel adjacent to and defining the hole therethrough, and said element having a heating element embedded in the plug and flange portions thereof and electrically energizable to vulcanize said patch to the surfaces of said pressure vessel.

2. A rubber patch element as defined in claim 1 wherein said heating element comprises a wire, the ends of which extend longitudinally of said tapered portion in electrically insulated spaced relation to each other and thence radially outwardly of the flange portion with the intermediate portion thereof extending annularly of said flange portion.

3. A rubber patch element as defined in claim 1 wherein said heating element is of a fusible material and of a dimension to break the electrical connection therethrough whenever the temperature thereof and thereby of the plug have reached the levels required to effectuate the vulcanizing of said patch to said pressure vessel.

4. A closure member adapted to seal an opening in a second member, both of said members being of flexible, thermally bondable materials, said closure member having a conically tapered plug portion insertable to sealingly engage mating surfaces defining a hole in the second member, a flange portion extending radially from the larger end of said tapered portion to define a radially extending shoulder engageable with the surface of said second member adjacent the larger end of the hole, and a heating element embedded in said plug and flange portions and electrically energizable to thermally bond the mating surfaces of said closure and pressure members, said heating element comprising a wire, the ends of which extend longitudinally of said tapered portion in electrically insulated spaced relation to each other and thence radially outwardly of the flange portion with the intermediate portion thereof extending annularly of said flange portion.

5. A closure member as defined in claim 4 including means associated with said heating element for breaking the electrical connection therethrough whenever the temperature level of said element exceeds a certain predetermined temperature.

6. A closure element of a thermally bondable material for a vessel of similar material, said closure element having a plug portion insertable to sealingly engage surfaces defining a hole in said vessel, a flange portion extending radially from one end of said plug portion and defining a radially extending surface engageable with the surfaces of said vessel adjacent said hole, and a heating element embedded therein and electrically energizable to thermally bond the engaging surfaces of said closure element and of said vessel.

7. A resilient patch for repairing a tubeless tire, said patch comprising a conically tapered plug portion insertable to sealingly engage mating surfaces defining a hole extending through the tire and a flange portion extending radially from the larger end of said tapered portion and engageable with the inner surface of the tire adjacent the hole, a coating of pressure sensitive adhesive on the surfaces of said patch engageable with the surfaces of said tire adjacent to and defining the hole therethrough, and said patch having a reinforcing wire element embedded therein extending longitudinally of said tapered portion and annularly of said flange portion.

8. A pressure vessel comprising a first member of a flexible thermally bondable material defining a pressure chamber, said first member having an opening therein converging conically toward the outside of said pressure member, and a closure member for said opening of a similar flexible and thermally bondable material, said closure member having a conically tapered plug portion insertable to sealingly engage the opening defining surfaces of said first member, a flange portion extending radially from the larger end of said tapered portion, and a wire element embedded therein and extending longitudinally of said tapered portion and thence annularly of said flange portion.

9. A rubber patch element for repairing a tubeless tire, said patch element comprising a plug portion insertable to sealingly engage mating surfaces defining a hole extending through the tire and a head portion extending radially from one end of said plug portion to define a radially extending surface engageable with the inner surface of the tire adjacent the hole, said element having an electrical heating element therein extending longitudinally of the plug portion and annularly of said flange portion, said heating element being energizable to vulcanize the patch element to the mating surfaces of the tire.

10. A rubber patch element as defined in claim 9 including means associated with said heating element for breaking the electrical connection therethrough whenever the temperature thereof and thereby of the plug have reached the levels required to effectuate the vulcanizing of the patch element to the tire.

References Cited in the file of this patent

UNITED STATES PATENTS

| Re. 21,230 | Crowley | Oct. 10, 1939 |
| 746,207 | Vosburgh | Dec. 8, 1903 |
| 852,716 | Hall | May 7, 1907 |
| 1,216,654 | Burke | Feb. 20, 1917 |
| 2,273,976 | Mitchell | Feb. 24, 1942 |